L. H. LLOYD.
THREE-WHEELED VEHICLE.
APPLICATION FILED DEC. 1, 1916.
1,248,354. Patented Nov. 27, 1917.
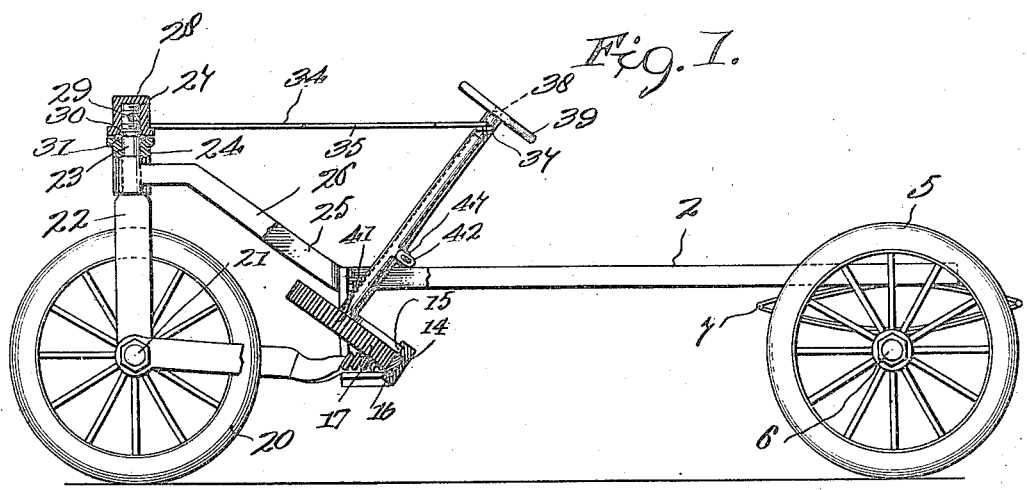
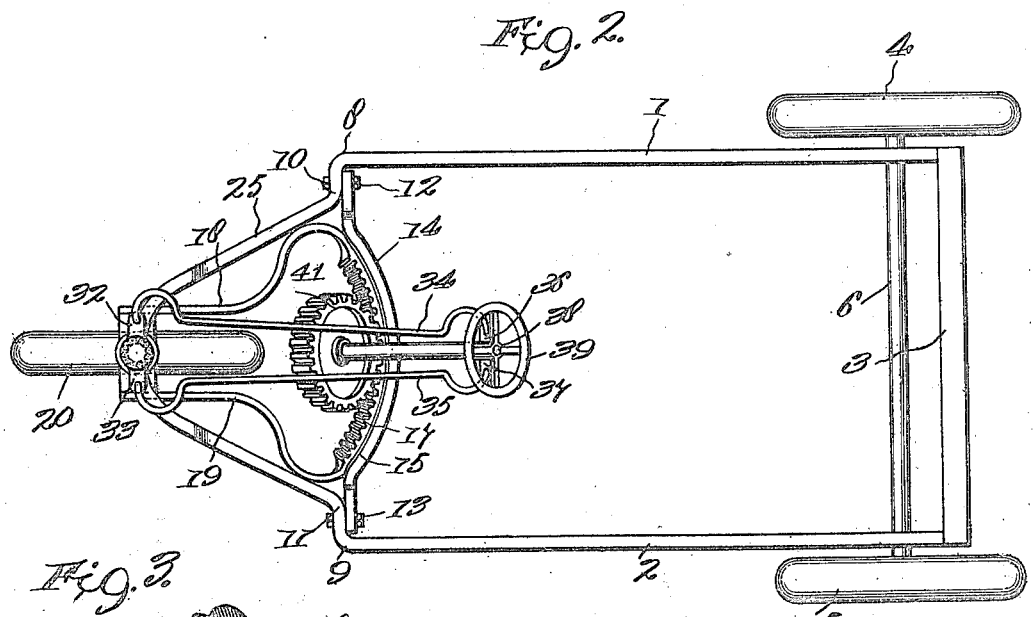
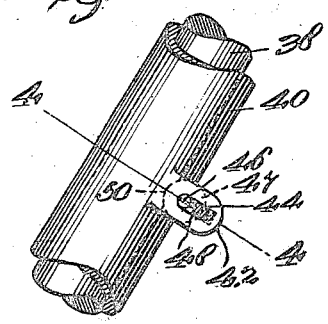
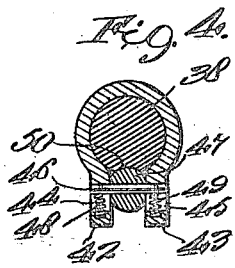

UNITED STATES PATENT OFFICE.

LEWIS HENRY LLOYD, OF BLOOMINGTON, ILLINOIS.

THREE-WHEELED VEHICLE.

1,248,354.  Specification of Letters Patent.  Patented Nov. 27, 1917.

Application filed December 1, 1916. Serial No. 134,449.

*To all whom it may concern:*

Be it known that I, LEWIS HENRY LLOYD, a citizen of the United States, residing at Bloomington, in the county of McLean and State of Illinois, have invented certain new and useful Improvements in Three-Wheeled Vehicles; and I do hereby declare the following to be a full, clear, and exact description of the invention, such as will enable others skilled in the art to which it appertains to make and use the same.

The present invention relates to improvements in automobiles or like vehicles, and has for an object to provide a vehicle frame which will be mounted on two rear wheels and a single central front steering wheel.

Another object of my invention lies in providing improved steering mechanism for turning the single front wheel, which latter is carried in forks having a stem fitted for rotation in a bearing provided by converging arms extending from the vehicle framework.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views:

Figure 1 is a side elevational view, partly in section, of a vehicle stripped of the body and engine, and illustrating my improved construction.

Fig. 2 is a top plan view thereof.

Fig. 3 is an enlarged fragmentary view of the steering post and housing; and

Fig. 4 is a transverse sectional view taken on the line 4—4 in Fig. 3.

Referring more particularly to the drawings, 1 and 2 designate the longitudinal sills, which may be of the usual channel construction. These longitudinal sills 1 and 2 are connected at their rear ends by a cross sill 3, and are supported by wheels 4 and 5 turning on an axle 6, between which and the vehicle framework are interposed the usual elliptic or other springs 7.

At their forward ends the longitudinal sills 1 and 2 are directed inwardly, preferably at right angles as shown at 8 and 9, thereby providing shoulders 10 and 11 to which are attached, as by the bolts or other fastening means 12 and 13, the opposite ends of a curved transverse bar 14. As disclosed to advantage in Fig. 1, this transverse bar 14 is formed with flanges 15 and 16, providing therebetween a channel in which a similarly curved rack bar 17 is fitted to move.

The opposite ends of the rack 17 are formed with, or connected to the curved rearward ends of arms 18 and 19, which extend forwardly and centrally of the vehicle frame in spaced relation and straddle a single front wheel 20, their forward ends being perforated and fitted over the axle 21 on which said wheel 20 turns.

The axle 21 is journaled in the lower ends of forks 22, which are carried on the lower end of a stem 23. A vertical bearing 24 receives the stem 23, the latter freely rotating therein in a manner to allow the front wheel 20 to be turned for purposes of steering the vehicle. This bearing 24 is supported at the meeting ends of converging arms 25 and 26, which extend from the shoulders 10 and 11 in an upward and forward direction, for which compare Figs. 1 and 2.

Above the bearing 24 the stem 23 is threaded, as indicated at 27, to receive a threaded cap 28 which rotates with the stem 23, and is preferably held to do so by a pin 29 passed through said cap and the upper threaded portion 27 of said stem. There is a cone bearing 30 carried by the stem 23 or cap 28 and ball bearings 31 between said cone and the upper end of the bearing 24. This construction insures facility in turning the wheel 20.

The cap 28 is formed with perforated lugs 32 and 33 extending in opposite directions, and connected respectively to the forward ends of links 34 and 35. These links have their rearward ends connected to similar perforated lugs 36 and 37, mounted to turn with a steering post 38 which has the usual hand wheel 39. This hand wheel is, according to the usual practice, situated in a convenient position for operation by the driver of the vehicle. The steering post 38 is mounted to revolve in a cylindrical housing 40, and carries upon its lower end a pinion 41 in mesh with the rack 17.

The housing 40 provides ears 42 and 43 having elongated slots 44 and 45 for slidably receiving the ends of a pin 46. A ball or head 47 is carried on the pin 46, and is urged by coil or other springs 48 and 49 into a socket 50 in the steering post 38. The socket 50 is adapted to come into a position where it may be occupied by the head or ball 47 when the steering wheel 39 is turned to a position which will direct the vehicle straight-forward. When in the socket 50, the head 47 will lock the steering mechanism.

The construction of the device is believed clear from the foregoing description, and the operation may be briefly described as follows:

When the driver of the vehicle turns the wheel 39 the steering post 38 is correspondingly turned in the housing 40, and when so turned will revolve the pinion 41 and drive the rack 17 in the channeled transverse bar 14. Accordingly as the steering post 38 is revolved in one or the other direction, the rack 17 is shifted to the right or left side of the vehicle, and in so doing its connected arms 18 and 19 receive a movement which will be transmitted to the forks 22 and front wheel 20, thereby turning the vehicle to the right or left, as desired.

Simultaneously with the turning of the steering post 38 the lugs 36 and 37 thereon will also be turned, and will thereupon draw upon one and push forwardly the other of the links 34 and 35, and in such manner transmitting through the lugs 32 and 33 a corresponding turning movement to the cap 28 and stem 23. After the turn has been made the wheel 39 is revolved back to the position where the socket 50 will be brought opposite the ball or head 47, which will be moved therein by the springs 48 and 49 and thereupon hold the vehicle to a straight course until the next turn is to be negotiated.

By having the steering connections associated with both the forks 22 and the stem 23, all binding effects of the parts are eliminated, and the wear on the bearings and movable elements will be reduced to a minimum.

Any suitable body with any number of slots may be mounted on the framework, as described, and any suitable engine may be installed on the vehicle and connected to drive the same by any suitable transmission mechanism.

It is obvious that those skilled in the art may vary the details of construction and arrangements of parts without departing from the spirit of my invention, and therefore I do not wish to be limited to such features except as may be required by the claims.

I claim:

1. A vehicle of the character described including a steering wheel, a fork carrying said steering wheel, a stem on said fork fitted to turn in the vehicle frame, and steering mechanism for revolving said wheel and fork including a rotatable post mounted in the vehicle frame, arms connected to said fork, connections for swinging said arms from the steering post, and means connecting said stem and steering post for rotating the former in its bearing in the frame, substantially as described.

2. In a vehicle of the character described, a frame providing a bearing therein, a stem rotatable in said bearing, forks carried by said stem, a steering wheel journaled in said forks, means for turning said forks and stem to steer the vehicle including a pair of arms connected to said forks, a rotatable steering post on the vehicle frame, means for swinging said arms in either direction when the steering post is rotated, and links connected between said stem and steering post for turning the former simultaneously with the forks, substantially as described.

3. In a vehicle of the character described, the combination of a main frame, a bearing supported at the forward central end of said frame, a stem rotatable in said bearing, forks depending from said stem, a steering wheel carried in said forks and supporting the forward end of the vehicle, arms connected to opposite sides of said forks, a rotatable steering post on the vehicle frame, gear connections between said steering post and arms for swinging the latter to steer the wheel, and independent connections between said steering post and stem for revolving the latter in said bearing, substantially as described.

4. A vehicle of the character described including a frame, a bearing at the forward end of said frame, a stem rotatably supported in said bearing, forks on said stem, a steering wheel journaled in said forks, arms connected to said forks, a rack for moving said arms, a steering post on the vehicle frame, a pinion carried on said steering post and in mesh with said rack, and independent means between said steering post and stem for turning the latter in said bearing, substantially as described.

5. A vehicle as described including a main frame, a curved and channeled cross bar at the front of said vehicle, a central bearing carried in the vehicle frame forwardly of said cross bar, a stem rotatable in said bearing, forks carried on said stem, a steering wheel journaled in said forks, arms connected to said forks, a curved rack connected to said arms and fitted to move in said channeled cross bar, a pinion disposed in mesh with said rack, a rotatable steering post for actuating said pinion, and independent connections between said steering post and stem for rotating the latter in said bearing, substantially as described.

6. A vehicle of the character described including a main frame, a bearing at the front of said frame, a stem turning in said bearing, forks carried on said stem, a wheel journaled in said forks, a rotatable steering post on the vehicle frame, means connected between said steering post and forks for turning the latter, lugs on said stem and steering post, and links connected between said lugs for turning the stem in said bearing, substantially as described.

7. A vehicle including a main frame, a steering wheel for said main frame, forks carrying said wheel, a stem on said forks supported to turn in said vehicle frame, means connected to said forks for turning the same, means independent of said last-named means connected to said stem for revolving the latter in the vehicle frame, a common steering post on the vehicle frame for operating each of said means and having a socket therein, a housing for said steering post, slotted ears on said housing, a pin having its ends movable in the slots in said ears, a head carried by said pin and adapted to engage the socket in said steering post to lock the same when turned to direct the vehicle straight-forward, and spring means for yieldingly holding said head in said socket, substantially as described.

8. A vehicle including a main frame, a curved and channeled cross bar mounted at the forward end of said frame, converging arms extending forwardly of said cross bar, a vertical bearing held in said arms, a stem turning in said bearing, forks depending from said stem, a wheel journaled in said forks, arms connected to said forks, a curved rack connected to said arms and fitted to move in said channeled cross bar, a pinion meshing with said rack, a rotatable steering post for actuating said pin and having a socket therein, a housing for said steering post, a yielding head carried by said housing for entering the socket in said post, and links connected between said steering post and stem for turning the latter in said bearing, substantially as described.

In testimony whereof, I affix my signature.

LEWIS HENRY LLOYD.

Copies of this patent may be obtained for five cents each, by addressing the "Commissioner of Patents, Washington, D. C."